United States Patent [19]

Fukushima et al.

[11] Patent Number: 4,903,983
[45] Date of Patent: Feb. 27, 1990

[54] ACTIVELY CONTROLLED AUTOMOTIVE SUSPENSION SYSTEM WITH IMPROVED CORNERING CHARACTERISTICS

[75] Inventors: Naoto Fukushima, Kamakura; Shuuji Torii, Yokohama, both of Japan

[73] Assignee: Nissan Motor Company, Limited, Yokohama, Japan

[21] Appl. No.: 52,934

[22] Filed: May 22, 1987

[30] Foreign Application Priority Data

May 23, 1986 [JP] Japan .................... 61-118675

[51] Int. Cl.⁴ .............................. B60G 17/00
[52] U.S. Cl. ................ 280/707; 364/424.05
[58] Field of Search ........... 280/707, 703, DIG. 1, 280/6 R, 6 H, 840, 6.12; 364/424.05

[56] References Cited

U.S. PATENT DOCUMENTS

| | | |
|---|---|---|
| 4,555,126 | 11/1985 | Ishimitsu et al. .............. 280/707 |
| 4,616,847 | 10/1986 | Kanai et al. .................... 280/707 |
| 4,625,985 | 12/1986 | Nakano et al. .................. 280/703 |
| 4,625,993 | 12/1986 | Williams et al. ................ 280/707 |
| 4,669,750 | 6/1987 | Tanaka et al. ................... 280/707 |
| 4,700,971 | 10/1987 | Doi et al. ........................ 280/707 |
| 4,712,807 | 12/1987 | Kurosawa ....................... 280/707 |
| 4,763,745 | 8/1988 | Eto et al. ......................... 280/707 |

FOREIGN PATENT DOCUMENTS

| | | |
|---|---|---|
| 0193124 | 9/1986 | European Pat. Off. . |
| 0193744 | 9/1986 | European Pat. Off. . |
| 186710 | 10/1984 | Japan ........................... 280/707 |
| 181713 | 8/1986 | Japan ........................... 280/707 |
| 34808 | 2/1987 | Japan ........................... 280/707 |
| 152910 | 7/1987 | Japan ........................... 280/707 |

OTHER PUBLICATIONS

Ikuo Ishimitsu, "Patent Abstracts of Japan", Suspension of Car, vol. 8, No. 182 (M-319 [1619], Aug. 22, 1984.

Primary Examiner—Charles A. Marmor
Assistant Examiner—Karyn Tyson
Attorney, Agent, or Firm—Foley & Lardner, Schwartz, Jeffery, Schwaab, Mack, Blumenthal & Evans

[57] ABSTRACT

A suspension system for an automotive vehicle employs a active suspension control feature for actively controlling the suspension characteristics according to the vehicle driving condition. Active suspension control is performed by adjusting offset of a gravity center for adjusting load distribution at respective vehicular wheels. The load distribution is adjusted so that the suspension characteristics can be changed to over-steer characteristics when the vehicle speed demand is higher than a given level so as to allow drift of the vehicle at a corner. In order to assure driving stability, the suspension system is further adjusted to suppress vehicular rolling during drift of the vehicle.

15 Claims, 6 Drawing Sheets $P = K_1 V_3 + P_0$

ACTIVELY CONTROLLED AUTOMOTIVE SUSPENSION SYSTEM WITH IMPROVED CORNERING CHARACTERISTICS

BACKGROUND OF THE INVENTION

1. Field of the Invention

The present invention relates generally to a suspension system for a vehicle. More specifically, the invention relates to an automotive suspension system with improved cornering characteristics. Further particularly, the invention relates to a control system for an automotive suspension system, which actively controls load distribution at respective vehicular wheels for better cornering characteristics.

2. Description of the Background Art

Generally, a typical construction of a suspension assembly comprises a suspension coil and shock absorber and is interposed between a vehicle body and a suspension member supporting a vehicular wheel, in order to constitute an automotive suspension system with the suspension member. The suspension coil spring generally resists against lad applied to maintain the vehicle body and the road wheel in a predetermined positional relationship to each other. On the other hand, the shock absorber is intended to damp or absorb vibrations transmitted between the vehicle body and the road wheel. The automotive suspension system may be further provided with a roll-stabilizer for suppressing vehicular rolling motion.

Some of the many kinds of automotive suspension systems include hydraulic circuits associated with fluid chambers in hydraulic shock absorbers for the controlling balance between the fluid pressures in the fluid chambers according to the relative displacement between the vehicle body and road wheel. Such hydraulic circuits include a fluid pressure source supplying working fluid at a given pressure to the circuits, and pressure control valves. The pressure control valves hydraulically connect and disconnect the fluid pressure source with the fluid chambers of the hydraulic shock absorbers for controlling pressure supply. The pressure control valves are controlled by an electric or electronic control system which switches the various valve positions to selectively introduce or drain fluid pressure into or from the fluid chambers so as to generate a damping force which suppresses vehicle body and road wheel vibrations.

These conventional positively controlled suspension systems encounter various defects and have not been at all satisfactorily capable of suppressing vibrations or bouncing of the vehicle body in order to ensure riding comfort. Specifically, conventional systems produce damping force by means of an orifice in the hydraulic circuit. However, due to flow resistance through the orifice, fluid pressure differences between the fluid chambers in the shock absorber cannot be easily balanced. When the balance is disturbed, the shock absorber tends to transmit vibration of the road wheel to the vehicle body which degrades riding comfort.

Therefore, it is an object of the present invention to provide an automotive suspension system which has a hydraulic damping force control circuit capable of effectively suppressing vehicle vibrations, thus ensuring riding comfort.

In order to provide this improvement, a positively or actively controlled automotive suspension system has been proposed in European Patent First Publication No. 01 93 124, published on Sept. 3, 1986, and assigned to the common owner of the present invention. The proposed positively controlled automotive suspension system comprises a hollow cylinder defining a chamber, a piston thrustingly received within the chamber of the cylinder and defining therein a first and second fluid chambers, both filled with a working fluid, the piston being free to move axially with the chamber, a fluid pressure source, a hydraulic circuit connecting the first and second fluid chambers and the fluid pressure source, a pressure control valve disposed within the hydraulic circuit and adapted to selectively establish and block fluid communication between the first and second fluid chambers and the fluid pressure source, means responsive to relative displacement between a vehicle body and road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

On the other hand, as is well known, driving torque to rotate the road wheel acts on the tread of the road wheel as longitudinal force. On the other hand, in cornering, a lateral force acts on the tread of the road wheel due to centrifugal force. The combined force of the driving torque and the lateral force determines the cornering characteristics of the vehicle. Namely, cornering force is the counter force against the combined longitudinal and lateral forces as set forth. Generally, the magnitude of this counter force to be generated is determined by road/tire friction. The magnitude of the road/tire friction is variable depending upon the load applied to the road wheel. Therefore, the combination of the combined force and the counter force at each vehicular wheel will determine the cornering characteristics of the vehicle.

In other words, the maximum counter force to be generated at each wheel is determined by road/tire friction. The distribution of the friction magnitude at the respective road wheel is variable depending upon the shift of a gravity center during cornering due to the change of load distribution. When the lateral force becomes greater than the maximum lateral component of the counter force, the tire loses traction to cause a lateral slide to increase over-steer characteristics. On the other hand, as long as the road/tire traction is maintained, under-steer characteristics may increase according to increasing driving torque as the longitudinal force. This prevents the vehicle from handling the corner at high speed. Therefore, in order to optimize cornering characteristics of the vehicle at relatively high speed, balance of the combined force of the longitudinal and lateral forces and the counter force is required. However, in order to obtain such optimum cornering characteristics, high driving techniques, such as delicate accelerator pedal control and steering operation synchronized with accelerator pedal control is required.

SUMMARY OF THE INVENTION

It is an object of the present invention to provide an actively controlled automotive suspension system which automatically controls the suspension characteristics for obtaining optimum cornering characteristics to allow driving of the vehicle through the corner at relatively high speed.

Another object of the invention is to provide an automotive suspension system with variable stiffness, which stiffness is controlled to permit a desired magnitude of tail-slide in cornering to allow high speed cornering, automatically.

In order to accomplish the aforementioned and other objects of the invention, a suspension system for an automotive vehicle, according to the present invention, employs an active suspension control feature for actively controlling the suspension characteristics according to the vehicle driving conditions. Active suspension control is performed by adjusting offset of a gravity center for adjusting load distribution at respective vehicular wheels. The load distribution is adjusted so that the suspension characteristics can be changed to over-steer characteristics when the vehicle speed demand is higher than a given level so as to allow drift of the vehicle at a corner.

In the preferred construction, in order to assure driving stability, the suspension system is further adjusted to suppress vehicular rolling during drift of the vehicle.

According to one aspect of the invention, a suspension system for an automotive vehicle comprises damper assemblies disposed between a vehicle body and a plurality of suspension members which support respectively associated road wheels, each of the damper assemblies including hydraulic means having adjustable hydraulic pressure, a hydraulic circuit connected to the hydraulic means for supplying pressurized working fluid thereto, sensor means for monitoring predetermined vehicle driving conditions indicating parameters to produce a driving condition indicating sensor signal, and a controller responsive to the driving condition indicating sensor signal to derive a load distribution at respective road wheels, the controller producing pressure control signals for the respective hydraulic means to cause a change of hydraulic pressure in each damper assembly to cause an offset of the gravity center of the vehicle body at a controlled magnitude and controlled direction to obtain derived load distribution for desired optimum vehicle driving characteristics.

In the preferred arrangement, the sensor means includes means for monitoring vehicular speed demand indicating parameters to produce a vehicular speed indicating sensor signal, and the controller responsive to the vehicular speed demand indicating sensor signal to derive a load distribution coefficient on which the load distribution is derived. The load distribution coefficient defines load distribution between front road wheels and rear road wheels.

In the preferred construction, the hydraulic means comprises a hydraulic cylinder having disposed therein a reciprocating piston which defines a fluid chamber within the hydraulic cylinder and responsive to the hydraulic pressure within the fluid chamber, and a valve means interposed between the hydraulic circuit and the fluid chamber for supplying and draining pressurized working fluid to and from the fluid chamber for adjusting fluid pressure in the fluid chamber according to the pressure control signal. The pressure control valve includes a valve body and an electrically operable actuator for shifting the valve body for adjusting fluid pressure in the fluid chamber according to the pressure control signal.

The sensor means may include means for monitoring lateral force exerted on the vehicle for producing a lateral force indicating signal and means for monitoring vehicular speed demand indicating parameters to produce a vehicular speed indicating sensor signal, and the controller responsive to the lateral force indicating signal and vehicular speed demand indicating sensor signal to derive a load distribution coefficient on which the load distribution is derived. The controller is responsive to vehicular speed demand indicating parameter having a value greater than a predetermined value to change vehicular steering characteristics to over-steer characteristics.

According to another aspect of the invention, a suspension system for an automotive vehicle for allowing increased cornering speed and/or allowing application of higher driving torque during cornering comprises damper assemblies disposed between a vehicle body and a plurality of suspension members which support respectively associated road wheels, each of the damper assemblies including hydraulic means having adjustable hydraulic pressure, a hydraulic circuit connected to the hydraulic means for supplying pressurized working fluid thereto, sensor means for monitoring predetermined vehicle driving condition indicating parameters to produce a driving condition indicating sensor signal, and a controller responsive to the driving condition indicating sensor signal to derive load distribution at respective road wheels, the controller producing pressure control signals for the respective hydraulic means to cause a change of hydraulic pressure in each damper assembly to cause an offset of gravity center of the vehicle body at a controlled magnitude and controlled direction to obtain a derived load distribution for desired optimum vehicle cornering characteristics.

According to a further aspect of the invention, a suspension control system for providing optimum cornering characteristics with increased cornering speed, comprises suspension systems provided for respective road wheels for producing damping forces against vertically exerted forces, each suspension system including means for adjusting damping characteristics thereof, a first sensor for detecting vehicular driving speed demand in excess of a predetermined value to produce a first sensor signal, a second sensor for detecting the vehicular steering condition at a corner to produce a second sensor signal, a controller responsive to the first and second sensor signals for deriving suspension control signals for controlling the damping characteristic adjusting means in order to adjust stiffness of respective suspension systems for adjusting load distribution at respective wheels for obtaining optimum cornering characteristics of the vehicle.

The controller is responsive to the first sensor signal and the second sensor signal to adjust stiffness of respective suspension systems so that cornering force at the rear wheels is decreased to provide over-steer characteristics of the vehicle. Preferably, the controller stiffens suspension systems for wheels located remote from the center of the corner and softens suspension systems for wheels located close to the center for suppressing vehicular rolling in order to assure traction at the respective wheels.

According to yet a further aspect of the invention, a suspension control system for providing optimum cornering characteristics with increased cornering speed, comprises suspension systems provided for respective road wheels for producing damping forces against vertically exerted forces, each suspension system including means for adjusting damping characteristics thereof, a first sensor for detecting vehicular driving speed demand to produce a first sensor signal indicative thereof, a second sensor for detecting vehicular steering condition to produce a second sensor signal indicative thereof, and a controller responsive to the first and second sensor signals for detecting vehicle driving conditions on the basis thereof and deriving suspension control signals for controlling the damping characteristic adjusting means in order to adjust stiffness of respective suspension systems for adjusting load distribution at respective wheels for obtaining optimum cornering characteristics of the vehicle, the controller responsive to the first sensor signal value greater than a given value to adjust stiffness of respective suspension systems so that the cornering force at rear wheels is decreased to provide over-steer characteristics of the vehicle.

BRIEF DESCRIPTION OF THE DRAWINGS

In the drawings:

FIGS. 4(A) and 4(B) are enlarged sections showing the detail of the hydraulic pressure control valve of FIG. 3, in which, FIG. 4(A) shows the valve position softening the shock absorber and FIG. 4(B) shows the valve position hardening the shock absorber;

DESCRIPTION OF THE PREFERRED EMBODIMENT

Figure 1:
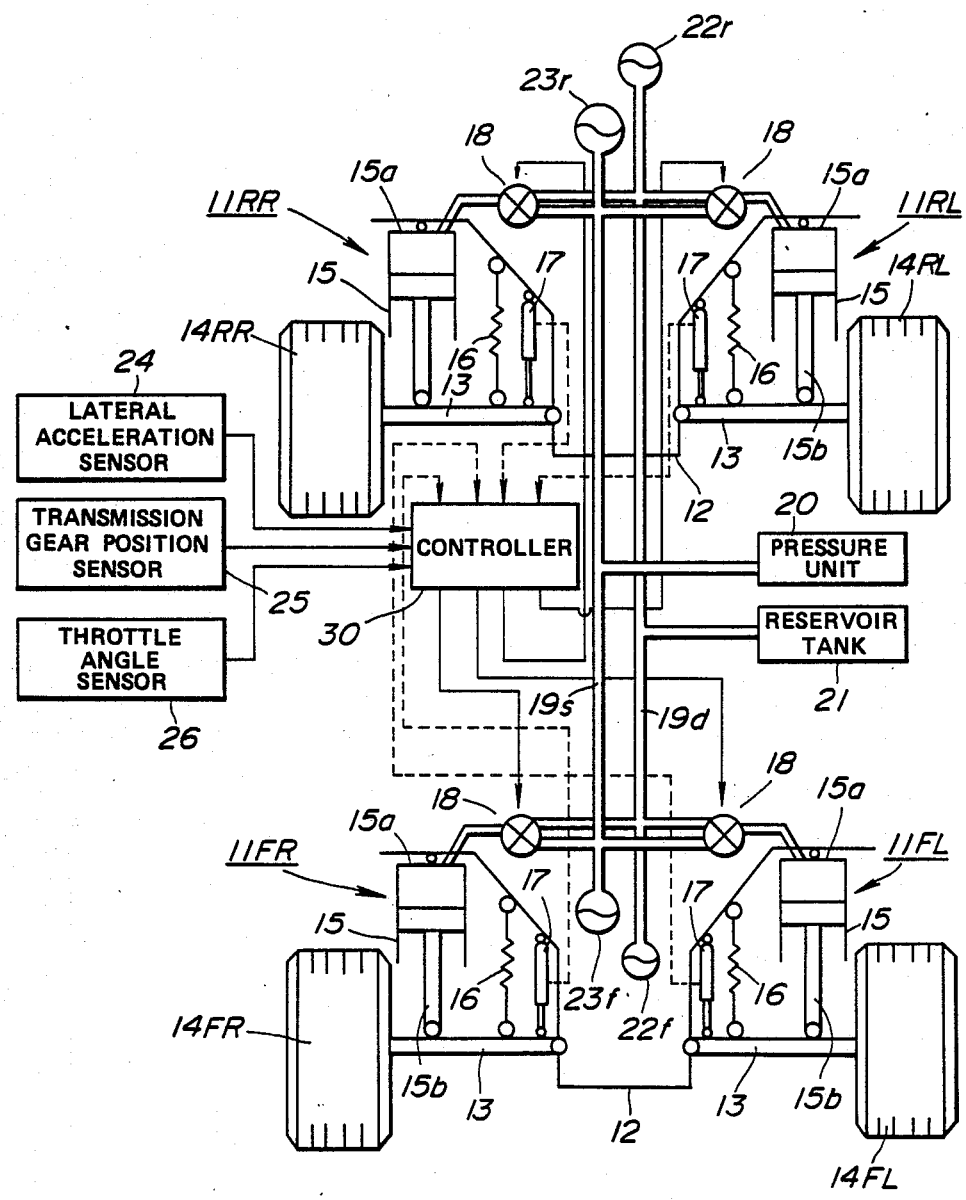
FIG. 1 is a diagrammatical illustration showing the overall construction of the preferred embodiment of an automotive suspension system with a control system actively controlling the suspension system according to the present invention.

Referring now to the drawings, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator, and a coil spring 16. The hydraulic cylinder 15A has a hollow cylinder housing 15a filled with a viscous working fluid and a piston 15b sealingly and thrustingly disposed within the internal space of the cylinder housing to divide the cylinder space into upper and lower fluid chambers 15d and 15e. A piston rod 15c extends through one end of the cylinder housing 15a. The other end of the cylinder housing 15a is connected to one of the vehicle body 12 and the suspension member 13. On the other hand, the end of the piston rod 15c is connected to the other end of the vehicle body 12 and the suspension member 13.

The hydraulic cylinder 15A of the suspension assembly 15 is connected to a hydraulic pressure source unit 20 via a hydraulic circuit which includes pressure control valve 18. The pressure control valve 18 is electrically operable and connected to a control unit 30. The hydraulic circuit 19 includes a supply line 19s and a drain line 19d. High pressure accumulators 22f and 22r are connected to the supply line 19s and a low pressure accumulator 23f and 23r are connected to the drain line 19d. The pressure source unit comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto.

The controller 30 is connected to stroke sensors 17 which are respectively interposed between the vehicle body 12 and the corresponding suspension members 13. Each stroke sensor comprises a potentiometer, for example, and is designed to monitor the relative distance between the vehicle body 12 and the associated suspension member 13 to produce a stroke indicating signal. The stroke indicating signal varies with the signal value to indicate the magnitude of relative displacement of the vehicle body 12 and the suspension member 13 from the neutral position. Namely, when the relative distance expands, the stroke indicating signal value becomes positive and increases as does the expanded magnitude, and when the relative distance decreases from the neutral position, the stroke indicating signal value decreases as does the relative distance.

The controller 30 is also connected to a lateral acceleration sensor 24, a transmission gear position sensor 25 and a throttle angle sensor 26. The lateral acceleration sensor 24 monitors acceleration laterally exerted on the vehicle to produce a lateral acceleration indicating signal $\alpha$. The lateral acceleration indicating signal value $\alpha$ has a voltage variable depending upon the magnitude and direction of the lateral acceleration. In the illustrated embodiment, the positive voltage of the lateral acceleration indicating signal increases with the leftward lateral acceleration, and the negative voltage decreases as rightward lateral acceleration increases. The transmission gear position sensor 25 is associated with an automotive power transmission to detect the shift position of the transmission to produce a transmission gear position indicating signal g. The transmission gear position indicating signal has a voltage variable depending upon the transmission gear position. On the other hand, the throttle angle sensor 26 monitors the angular position of a throttle valve (not shown) linked with an accelerator pedal (not shown) in per se well known manner, to produce a throttle angle indicating signal $\theta$.

The transmission gear position sensor 24 and the throttle angle sensor 26 constitute a vehicle driving condition indicating parameter detecting means. On the other hand, the lateral acceleration sensor 24 constitutes a vehicle running condition indicating parameter detecting means.

The controller 30 receives the aforementioned stroke indicating signals from the stroke sensors 17, a lateral acceleration indicating signal α from the lateral acceleration sensor 24, the transmission gear position indicating signal g from the transmission gear position sensor 25 and the throttle angle indicating signal θ of the throttle angle sensor 26 to derive a control signal based thereon. The controller 30 outputs the control signal to the pressure control valves 18.

Figure 2:
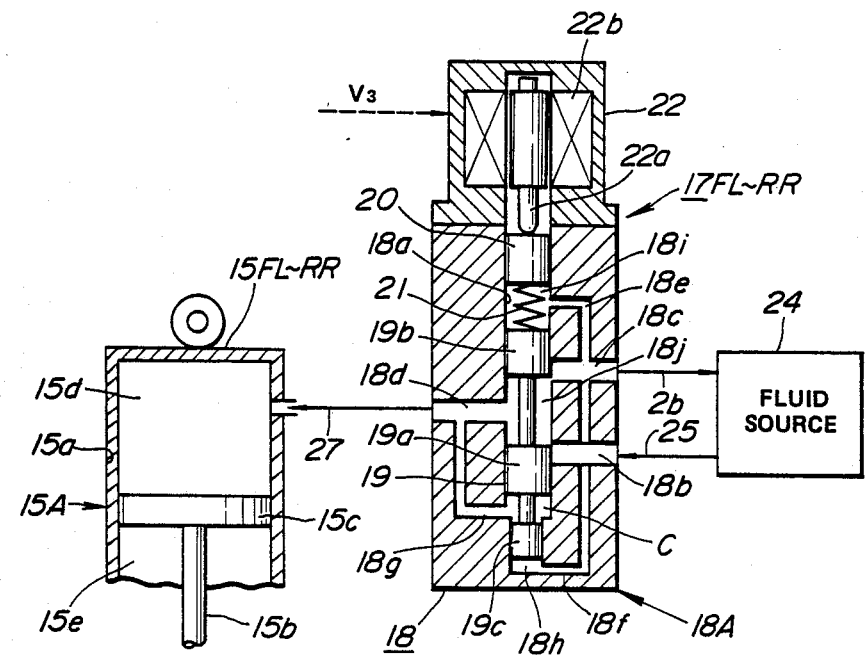
FIG. 2 is a section of one example of a hydraulic shock absorber in combination with a hydraulic pressure control valve associated with the shock absorber for adjusting stiffness of the latter.

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands, 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuation rod 29 is also disposed within the valve bore 18a. The actuation rod 20 opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and thereby communicated with the upper fluid chamber 15d. On the other hand, the pressure chamber 18j shifts according to shifting of the valve spool 19 to selectively communicate with the inlet port 18b and the drain port 18c. On the other hand, annular pressure control chamber 18k is defined between the first and third lands 19a and 19c. The pressure control chamber 18k is in communication with the outlet port 18d via a pilot path 18g. A bias spring 21 is interposed between the actuation rod 20 and the valve spool 19. The actuation rod 20 contacts an actuator rod 22a of an electrically operable actuator 22 which comprises an electromagnetic solenoid. The solenoid 22 comprises a proportional solenoid.

Figure 3:
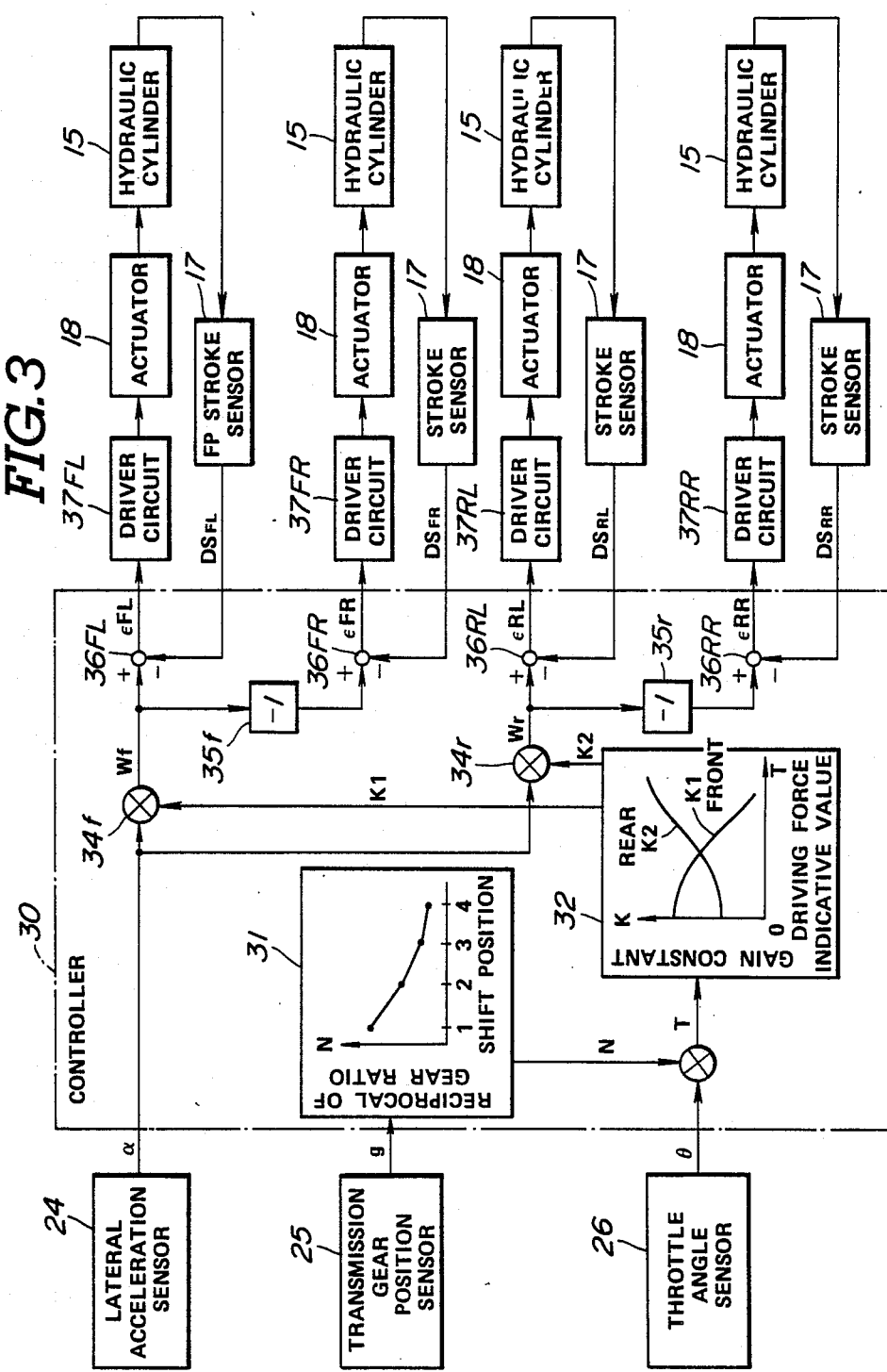
FIG. 3 is a block diagram of the suspension control system in the actively controlled automotive suspension system of FIG. 1.

FIG. 3 shows the controller 30 in the form of a block diagram. The controller 30 generally comprises a first driving parameter indicating value generator 31, a second driving parameter indicating gain constant generating circuit 32, multipliers 33, 34f and 34r, inverters 35f and 35r, and comparators 36FL, 36FR, 36RL and 36RR. The first driving parameter indicating value generator circuit 31 derives a first driving parameter indicating value. In the shown embodiment, the first driving parameter indicating value generator circuit 31 receives the transmission gear position indicating signal g from the transmission gear position sensor 25. The first driving parameter indicating value generator 31 derives a reciprocal of the gear ratio corresponding to the transmission gear position as represented by the transmission gear position indicating signal. In practice, the first driving parameter indicating value generator comprises a plurality of value generators, each of which is designed to produce a value corresponding to the reciprocal of the gear ratio at the corresponding transmission gear position. In response to the transmission gear position indicating signal g from the transmission gear position sensor 25, one of the value generators which corresponds to one of the transmission gear positions as indicated in the transmission gear position indicating signal, is triggered to output a first driving value indicating signal N. The first driving coefficient indicating signal N is fed to the multiplier 33. The multiplier 33 also receives the throttle angle indicating signal T from the throttle angle sensor 26. The multiplier 33 multiples the first value indicating signal N with the throttle angle indicating signal θ to derive an assumed driving force indicating value T. The assumed driving force indicating value T is fed to the driving parameter indicating gain constant generating circuit 32. The driving parameter indicating gain constant generating circuit 32 derives a gain constant based on the second driving parameter indicating value T.

In order to derive the gain constant, the driving parameter indicating gain constant generating circuit 32 has a gain constant data table which is in the form of a look-up table. The gain contact data table is looked up in terms of the assumed driving force T. As will be seen in FIG. 3, the gain contact $K_1$ for the front wheels 14FL and 14FR gradually decreases according to increasing of the assumed driving force T. The gain constant $K_1$ for the front wheels 14FL and 14FR is hereafter referred to as "front gain constant". On the other hand, the gain constant $K_2$ for the rear wheels 14RL and 14RR increases according to increasing of the assumed driving force T. The gain constant $K_2$ for the rear wheels 14RL and 14RR is hereafter referred to as "rear gain constant". When the assumed driving force T is zero, the front gain constant $K_1$ is greater than the rear gain constant $K_2$. The difference between the front and rear gain constants $K_1$ and $K_2$ decreases as the assumed driving force increases. The rear gain constant $K_2$ increases across the front gain constant $K_1$ at a given assumed driving force.

The driving parameter indicating gain constant generating circuit 32 outputs a front gain indicating signal representative of the front gain constant to the multiplier 34f and a rear gain indicating signal representative of the rear gain constant to the multiplier 34r. On the other the multipliers 34f and 34r are connected to the lateral acceleration sensor 24 to receive therefrom a lateral acceleration indicating signal having a lateral acceleration indicating value α. The lateral acceleration indication value α of the lateral acceleration indicating signal is multiplied by the front and rear gain constants $K_1$ and $K_2$ respectively in the multipliers 34f and 34r.

The multiplier 34f thus derives a magnitude of a shift of load between the front wheels 14FL and 14FR on the basis of the front gain constant $K_1$ as a front driving condition indicating variable, and the lateral acceleration. The value derived by the multiplier 34f is thus indicative of the magnitude of shifting of the load at respective front-left and front-right wheels and, in turn, indicative of the magnitude of variation of the relative distance between the vehicle body and the suspension member. Therefore, the multiplier outputs a front target stroke signal Wf indicative of the derived magnitude of the load shift between the front wheels. On the other hand, the multiplier 34r derives a magnitude of a shift of load between rear wheels 14RL and 14RR. The value derived by the multiplier 34r is thus indicative of the magnitude of shifting of the load at respective rear-left and rear-right wheels and, in turn, indicative of the magnitude of variation of the relative distance between the vehicle body and the suspension member. Therefore, the multiplier outputs a rear target stroke signal Wr having a value representative of the rear load shifting magnitude.

The multiplier 34f feeds the front load shift control signal Wf to a comparator 36FL for the front-left wheel and to a comparator 36FR via an inverter 35f. Therefore, the polarity of the front load shift control signals 36FL and 36FR becomes alternative. Similarly, the multiplier 34r feeds the rear load shift control signal Wr to a comparator 36RL for the front-left wheel and to a comparator 36RR via an inverter 35r. Therefore, the polarity of the front load shift control signals Wr to be applied to the comparators 36RL and 36RR becomes alternative.

Each comparator 36FL, 36FR, 36RL and 36RR is connected to the stroke sensor 17 to receive the stroke indicating signal $DS_{FL}$, $DS_{FR}$, $DS_{RL}$ and $DS_{RR}$. The comparators 36FL, 36RL and 36RR, respectively, compare the control signals Wf, −Wf, Wr and −Wr with respective stroke indicating signals $DS_{FL}$, $DS_{FR}$, $DS_{RL}$ and $DS_{RR}$ in order to derive error indicating signals $\epsilon_{FL}$, $\epsilon_{FR}$, $\epsilon_{RL}$ and $\epsilon_{RR}$. The error indicating signals $\epsilon_{FL}$, $\epsilon_{FR}$, $\epsilon_{RL}$ and $\epsilon_{RR}$, respectively, are representative of the magnitude of variation of the stroke of the hydraulic cylinders 15 at respective front-left, front-right, rear-left and rear-right wheels 14FL, 14FR, 14RL and 14RR. The comparators 36FL, 36FR, 36RL and 36RR feed the error indicating signals $\epsilon_{FL}$, $\epsilon_{FR}$, $\epsilon_{RL}$ and $\epsilon_{RR}$ to respectively associated driver circuits 37FL, 37FR, 37RL and 37RR. The driver circuits produce drive signals for respectively associated actuators 22 of the pressure control valves 18. The actuators 22 are thus actuated at the magnitudes respectively corresponding to the error values indicated by the effort indicating signal $\epsilon_{FL}$, $\epsilon_{FR}$, $\epsilon_{RL}$ and $\epsilon_{RR}$, in order to reduce the error to zero.

In the operation of the aforementioned controller 30, the input from the lateral acceleration sensor 24 is maintained at zero as long as the vehicle travels substantially straight and thus substantially no lateral force is exerted on the vehicle. As a result, the output as the front and rear target stroke indicating signals, of the multipliers 34f and 34r becomes substantially zero. At this time, the relative distances between the vehicle body and the suspension members are maintained substantially at the neutral position, since no lateral force is applied. Therefore, the values of the stroke indicating signals $DS_{FL}$, $DS_{FR}$, $DS_{RL}$ and $DS_{RR}$ to be inputted to the comparators 36FL, 36FR, 36RL and 36RR from respectively corresponding stroke sensors 17 are held substantially at zero. Therefore, the output value of the comparators 36FL, 36FR, 36RL and 36RR are held at zero. Therefore, the error indicating signals $\epsilon_{FL}$, $\epsilon_{FR}$, $\epsilon_{RL}$ and $\epsilon_{RR}$ output from the comparators 36FL, 36FR, 36RL and 36RR are held substantially at zero. As a result, the driver circuit 37FL, 37FR, 37RL and 37RR are held inoperative to maintain the actuators 22 of respective pressure control valves 18 in place.

On the other hand, when a vehicular steering operation is performed to change driving direction, lateral force is exerted on the vehicle body to generate the lateral acceleration. The lateral acceleration sensor 24 then outputs the lateral acceleration indicating signal with a value $\alpha$. As a result, the output values Wf and Wr as the front and rear target stroke indicating values become $(\alpha \times K_1)$ and $(\alpha \times K_2)$ respectively.

At the same time, steering operation may cause vehicular rolling to cause variation of the relative distances between the vehicle body and suspension members at the positions of the front-left, front-right, rear-left and rear-right wheels. Therefore, the stroke indicating signal value varies from zero.

For instance, if left-hand steering is performed through a steering wheel of the vehicle, the rightward centrifugal force is exerted on the vehicle to cause vehicular rolling to lower the right-side of the vehicle body and to raise the left-side of the vehicle body. Therefore, the stroke indicating signal values from the stroke sensors 17 associated with the front-left and rear-left wheels become positive and the stroke indicating signal values from the stroke sensors 17 associated with the front-right and rear-right wheels become negative. On the other hand, as set forth above, the lateral acceleration indicating signal values from the lateral acceleration sensor 24 become a negative value $(-\alpha)$. Therefore, the front and rear target strokes Wf and Wr become negative. The negative value of the front target stroke $(-Wf)$ is input to the comparator 36FL to be compared with the positive value of the stroke indicating signal $DS_{FL}$. Therefore, the error indicating signal $\epsilon_{FL}$ indicative of the difference of the front target stroke indicating signal and the stroke indicating signal to reduce magnitude of rising cause a downward shift across the neutral position at the front-left wheel toward the front target stroke $(-Wf)$. On the other hand, the inverted front target stroke $(+Wf)$ is input to the comparator 36FR. The comparator 36FR also receives the negative value of the stroke indicating signal from the stroke sensor 17 associated with the front-right wheel. As a result, the error indicating signal $\epsilon_{FR}$ will be derived to adjust the relative distance between the vehicle body and the front-right suspension member toward the inverted front target stroke $(+Wf)$. Similarly, the negative value of the rear target stroke $(-Wr)$ is input to the comparator 36RL to be compared with the positive value of the stroke indicating signal DSRL. Therefore, the error indicating signal $\epsilon_{RL}$ indicative of the difference of the rear target stroke indicating signal and the stroke indicating signal to reduce the magnitude of rising cause a downward shift down across the neutral position at the front-left wheel toward the rear target stroke $(-Wr)$. On the other hand, the inverted rear target stroke $(+Wr)$ is input to the comparator 36FR. The comparator 36FR also receives the negative value of the stroke indicating signal from the stroke sensor 17 associated with the rear-right wheel. As a result, the error indicating signal $\epsilon_{RR}$ will be derived to adjust the relative distance between the vehicle body and the rear-right suspension member toward the inverted rear target stroke $(+Wr)$.

Figure 5:
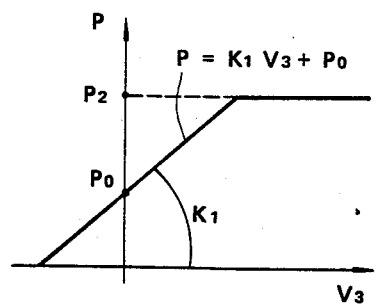
FIG. 5 is a graph showing variation of hydraulic pressure to be supplied to a pressure control valve according to variation of drive signal voltage.

Based on the error indicating signals $\epsilon_{FL}$, $\epsilon_{FR}$, $\epsilon_{RL}$ and $\epsilon_{RR}$ as set forth above, the driver circuits 37FL, 37FR, 37RL and 37RR output drive signals to the respectively associated actuators 22. The driver signal value is variable to control the position of the valve spool 19. The pressure control valve 18 is designed to supply the working fluid pressure $P_0$ (shown in FIG. 5) to the upper fluid chamber 15d. As will be seen from FIG. 5, the working fluid pressure to be supplied to the upper fluid chamber 15d increases with the drive signal voltage V and decreases with the drive signal voltage. By increasing the working fluid pressure in the upper fluid chamber 15d of the hydraulic cylinder 15a, the piston 15 strokes to expand the relative distance between the vehicle body and the suspension member, which piston stroke will be hereafter referred to as "expansion stroke". On the other hand, when the working fluid pressure in the upper fluid chamber 15d is decreased, the piston strokes to reduce the relative distance between the vehicle body and the associated suspension member.

Figure 4:
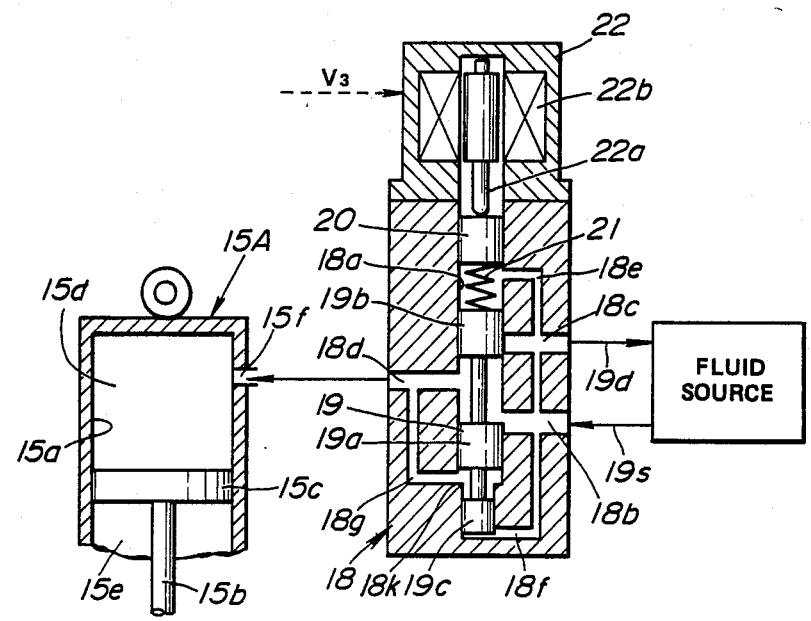
Figure 4:
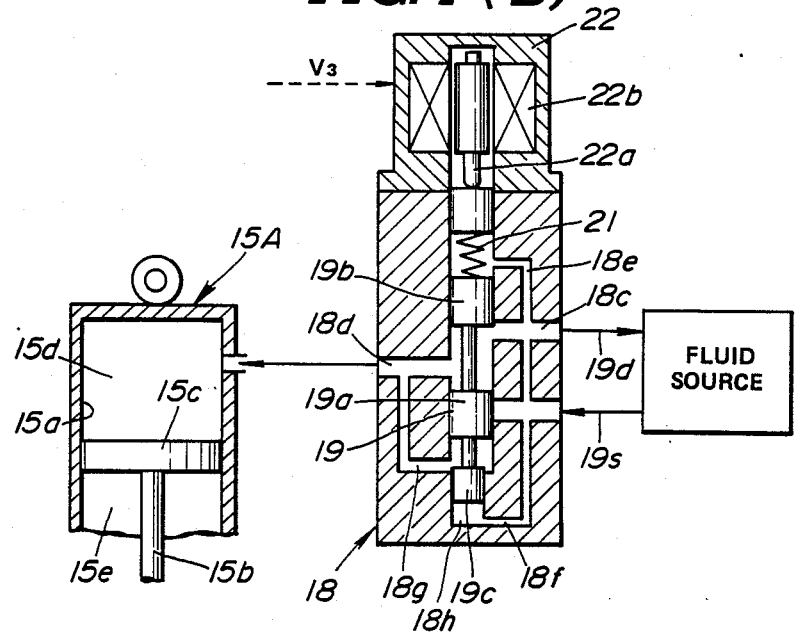

In order to increase the supply pressure of the working fluid the spool valve 19 is shifted to the position shown in FIG. 4(A) to increase path area at a throttle constituted at the inner end of the inlet port 18b by means of the land 19a of the spool valve 19. On the other hand, in order to decrease the supply pressure of the working fluid, the spool valve is shifted to the position shown in FIG. 4(B) to decrease the path area at the throttle of the inner end of the inlet port 18b and opens the drain port 18 which is normally blocked by means of the land 19b of the spool valve.

Construction of the pressure control valves should not be limited to the construction as illustrated in FIGS. 2, 4(A) and 4(B) but can be replaced with any appropriate constructions. For example, the pressure control valve constructions as illustrated in European Patent First Publication No. 01 93 124, set forth above, can also be employed. The disclosure of the aforementioned European Patent First Publication 01 93 124 is herein incorporated by reference for the sake of disclosure.

Figure 6:
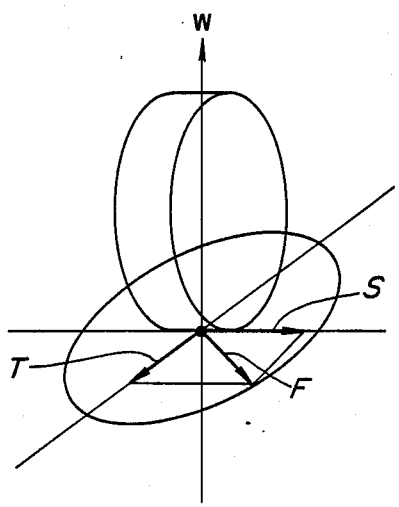
FIG. 6 is an explanatory illustration showing the forces to be exerted on a road wheel during cornering.
Figure 7:
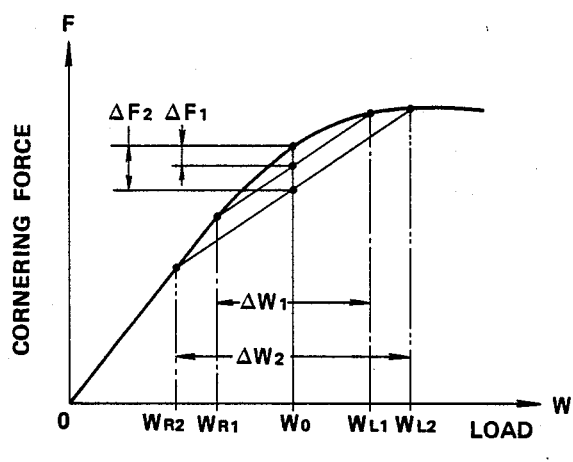
FIG. 7 is a graph showing the variation of cornering force according to shifting of the gravity center or variation of the load applied to road wheels.
Figure 8:
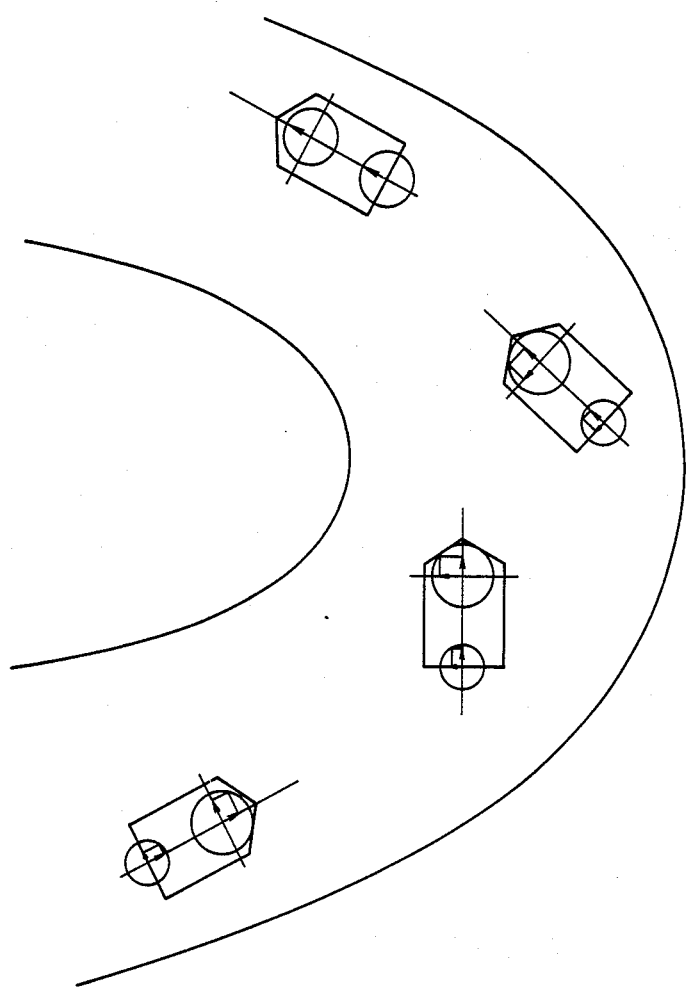
FIG. 8 is an illustration of the variation of attitude of the vehicle during cornering at high speed.

On the other hand, as will be seen from FIGS. 6 and 7, driving torque T to rotate the road wheel exerts to the tread of the road wheel a longitudinal force. On the other hand, in cornering, lateral force acts on the tread of the road wheel due to centrifugal force. The combined force F of the driving torque and the lateral force determines the cornering characteristics of the vehicle. Namely, cornering force F which is the combined force of a lateral counter force S and the driving torque T, as the counter force against the combined force of the centrifugal force and the driving torque as set forth, is generated. Generally, the magnitude of this counter force F to be generated is determined by road/tire friction, the magnitude of which is illustrated by a circle in FIG. 5 for the purpose of illustration. The magnitude of the road/tire friction is variable depending upon the load W applied to the road wheel. Therefore, the combination of the combined force and the counter force thereagainst at each vehicular wheel will determine the cornering characteristics of the vehicle.

In other words, the maximum counter force Fmax to be generated at each wheel is determined by road/tire friction. Here, assuming the loads at the left and right wheels are respectively $W_L$ and $W_R$, the average load of the left and right wheel loads $W_L$ and $W_R$ is $W_0$ and a magnitude of shift of the load between the left and right wheels with respect to the center thereof is $\Delta W$, the maximum counter force Fmax decreases according to air increase of the load shift magnitude $\Delta W$. In other words, the distribution of the friction magnitude at the respective road wheel is variable depending upon the shift of a gravity center during cornering due to the resulting change of load distribution. When the lateral force becomes greater than the maximum lateral component of the counter force, the tire causes a break of traction to cause lateral slide to increase over-steer characteristics. On the other hand, as long as the road/tire traction is maintained, under-steer characteristics may increase according to increasing of driving torque as the longitudinal force. This prevents the vehicle to corner at high speed. Therefore, in order to optimize cornering characteristics of the vehicle at relatively high speed, balance of the combined force of the longitudinal and lateral forces and the counter force to cause slight lateral slide is required. However, in order to obtain such optimum cornering characteristics, quite high driving techniques, such as delicate accelerator pedal control and delicate steering operation synchronized with accelerator pedal control is required.

Namely, assuming the load shift magnitude increase from $\Delta W$ ($W_{L1}$, $W_{R1}$) to $\Delta W$ ($W_{L2}$, $W_R$), the maximum counter force varies from $\Delta F_1$ to $\Delta F_2$. This means tendency of over-steer in cornering increases by shifting load between left and right wheels.

By the control operation of the controller 30, the rolling direction of the vehicle is reversed from the normal rolling direction. This changes the steering characteristics of the vehicle to be inclined toward over-steer characteristics. Therefore, as shown in FIG. 6, when the vehicle travels along a corner with a relatively high driving force, the vehicular suspension characteristics change toward the over-steer characteristics to cause tail-slide to drift without requiring any attention and/or skill of the driver.

Therefore, the present invention fulfills all of the objects and advantages sought therefor.

What is claimed is:

1. A suspension system for an automotive vehicle comprising:
    damper assemblies disposed between a vehicle body and a plurality of suspension members supporting respectively associated road wheels, each of said damper assemblies including hydraulic means having adjustable hydraulic pressure;
    a hydraulic circuit connected to said hydraulic means for supplying pressurized working fluid thereto;
    sensor means for monitoring predetermined vehicle driving condition indicating parameters relating to driving forces on the vehicle to produce a driving condition indicating sensor signal and for monitoring at least one running condition indicating parameter relating to lateral forces on the vehicle to produce a running condition indicating sensor signal; and
    a controller responsive to said driving condition indicating sensor signal and said running condition indicating sensor signal to derive a desired load distribution at respective road wheels, said controller producing pressure control signals for respective ones of said hydraulic means to cause a change of hydraulic pressure in each damper assembly in such a manner that the combination of adjusted hydraulic pressure causes an offset of the gravity center of the vehicle body from a predetermined neutral gravity center position at a controlled magnitude and controlled direction to obtain desired load distribution for desired optimum vehicle driving characteristics.

2. The suspension system as set forth in claim 1, wherein said hydraulic means comprises a hydraulic cylinder having disposed therein a reciprocating piston which defines a fluid chamber within said hydraulic cylinder and responsive to the hydraulic pressure within said fluid chamber, and valve means interposed between said hydraulic circuit and said fluid chamber for supplying and draining pressurized working fluid to and from said fluid chamber for adjusting fluid pressure in said fluid chamber according to said pressure control signal.

3. The suspension system as set forth in claim 2, wherein said sensor means includes a transmission gear position sensor, a throttle angle sensor and a lateral acceleration sensor to derive a load distribution coefficient based on which said load distribution is derived.

4. The suspension system as set forth in claim 3, wherein said controller is responsive to said sensor means to change vehicular steering characteristic to over-steer characteristics.

5. The suspension system as set forth in claim 2, wherein said pressure control valve includes a valve body and an electrically operable actuator for shifting said valve body for adjusting fluid pressure in said fluid chamber according to said pressure control signal.

6. A suspension system as claimed in claim 1 wherein said damper assemblies control the height of said vehicle body relative to said road wheels and wherein said controller adjusts said height at each of said damper assemblies to offset the center of gravity of said vehicle.

7. A suspension system for an automotive vehicle comprising:
   damper assemblies disposed between a vehicle body and a plurality of suspension members supporting respectively associated road wheels, each of said damper assemblies including hydraulic means having adjustable hydraulic pressure;
   a hydraulic circuit connected to said hydraulic means for supplying pressurized working fluid thereto;
   sensor means for monitoring predetermined vehicle driving condition indicating parameters relating to driving forces on the vehicle to produce a driving condition indicating sensor signal and for monitoring at least one running condition indicating parameter relating to lateral forces on the vehicle to produce a running condition indicating sensor signal; and
   a controller responsive to said driving condition indicating sensor signal and said running condition indicating sensor signal to derive a load distribution at respective road wheels, said controller producing pressure control signals for respective ones of said hydraulic means to cause a change of hydraulic pressure in each damper assembly to cause an offset of the gravity center of the vehicle body at a controlled magnitude and controlled direction to obtain a derived load distribution for desired optimum vehicle driving characteristics,
   wherein said sensor means includes a transmission gear position sensor, a throttle angle sensor and a lateral acceleration sensor said controller deriving therefrom a load distribution coefficient based on which said load distribution is derived.

8. The suspension system as set forth in claim 7, wherein said load distribution coefficient defines load distribution between front road wheels and rear road wheels.

9. A suspension control system for providing optimum cornering characteristics with increased cornering speed, comprising:
   suspension systems provided for respective road wheels for producing damping forces against vertically exerted forces, each suspension system including means for adjusting damping characteristics thereof;
   first sensor means for monitoring predetermined vehicle driving condition indicating parameters relating to driving forces on the vehicle to produce a first sensor signal;
   second sensor means for monitoring at least one running condition indicating parameter relating to lateral forces on the vehicle to produce a second sensor signal; and
   a controller responsive to said first and second sensor signals for determining a desired load distribution at the road wheels of said vehicle and deriving suspension control signals for controlling said damping characteristic adjusting means in order to adjust stiffness of respective suspension systems for offsetting the center of gravity of said vehicle from a neutral gravity center position to obtain said desired load distribution at said road wheels for obtaining optimum cornering characteristics of the vehicle.

10. The suspension control system as set forth in claim 9, wherein said controller is responsive to said first sensor signal and said second sensor signal to adjust stiffness of respective suspension systems so that a cornering force at associate rear wheels is decreased to provide over-steer characteristics of the vehicle.

11. The suspension control system as set forth in claim 10, wherein said controller stiffens suspension systems for outside wheels during cornering and softens suspension systems for inside wheels during cornering for suppressing vehicular rolling in order to assure traction at respective wheels.

12. A suspension system as claimed in claim 9 wherein said damping characteristic adjusting means control the height of a body of said vehicle body relative to said wheels and wherein said controller adjusts said height at each of said damping characteristic adjusting means to offset the center of gravity of said vehicle.

13. A suspension control system for providing optimum cornering characteristics with increased cornering speed, comprising:
   suspension system provided for respective road wheels for producing damping forces against vertically exerted forces, each suspension system including means for adjusting damping characteristics thereof;
   first sensor means for monitoring predetermined vehicle driving condition indicating parameters relating to driving forces on said vehicle to produce a first sensor signal indicative thereof;
   second sensor means for monitoring at least one running condition indicating parameter relating to lateral forces on said vehicle to produce a second sensor signal indicative thereof; and
   a controller responsive to said first and second sensor signals for determining a desired load distribution for the wheels of the vehicle on the basis thereof and deriving suspension control signals for controlling said damping characteristic adjusting means in order to adjust stiffness of respective suspension systems for offsetting the center of gravity of said vehicle from a predetermined neutral gravity center position to adjust the load distribution at respective wheels to the desired load distribution for obtaining optimum cornering characteristics of the vehicle, said controller being responsive to said first sensor signal having a value greater than a given value to adjust stiffness of respective suspension system so that a cornering force of associated rear wheels is decreased to provide over-steer characteristics of the vehicle.

14. The suspension control system as set forth in claim 13, wherein said controller stiffens suspension systems for outside wheels during cornering and softens suspension systems for inside wheels during cornering for suppressing vehicular rolling in order to assure traction at respective wheels.

15. A suspension system as claimed in claim 13 wherein said damping characteristic adjusting means control the height of a body of said vehicle body relative to said wheels and wherein said controller adjusts said height at each of said damping characteristic adjusting means to offset the center of gravity of said vehicle.

* * * * *